United States Patent
Liu

(10) Patent No.: US 9,630,358 B1
(45) Date of Patent: Apr. 25, 2017

(54) THREADLESS PLASTIC BLOW MOLDING DEVICE

(71) Applicant: Chang Hsien Liu, Taoyuan (TW)

(72) Inventor: Chang Hsien Liu, Taoyuan (TW)

( * ) Notice: Subject to any disclaimer, the term of this patent is extended or adjusted under 35 U.S.C. 154(b) by 0 days.

(21) Appl. No.: 14/875,838

(22) Filed: Oct. 6, 2015

(51) Int. Cl.
  *B29C 49/48* (2006.01)
  *B29L 31/00* (2006.01)

(52) U.S. Cl.
  CPC ...... *B29C 49/48* (2013.01); *B29C 2049/4882* (2013.01); *B29C 2049/4892* (2013.01); *B29L 2031/7158* (2013.01)

(58) Field of Classification Search
  CPC ............ B29C 49/48; B29C 2049/4882; B29C 49/4242; B29C 2049/4294; B29C 49/4802; B29C 2049/5844
  See application file for complete search history.

(56) References Cited

U.S. PATENT DOCUMENTS

| | | | | |
|---|---|---|---|---|
| 3,502,758 A | * | 3/1970 | Plummer | B29C 49/48 264/161 |
| 3,947,205 A | * | 3/1976 | Edwards | B29C 49/0073 264/521 |
| 4,467,929 A | * | 8/1984 | Jakobsen | B29C 31/002 215/42 |
| 4,641,758 A | * | 2/1987 | Sugiura | B65D 1/10 215/42 |
| 4,704,243 A | * | 11/1987 | Nilsson | B29C 49/0073 264/292 |
| 4,867,929 A | * | 9/1989 | Albrecht | B29C 57/00 264/296 |
| 5,342,663 A | * | 8/1994 | Yokobayashi | B29C 45/26 215/43 |
| 5,543,107 A | * | 8/1996 | Malik | B29C 49/18 264/529 |
| 2006/0108315 A1 | * | 5/2006 | Britton | B29C 49/4242 215/321 |

* cited by examiner

*Primary Examiner* — Robert B Davis
(74) *Attorney, Agent, or Firm* — Rosenberg, Klein & Lee

(57) ABSTRACT

A threadless plastic blow molding device includes a main molding-base, a bottom molding-base, and a blow molding-base. The main molding-base has two mating portions each defines a recessed cavity. The recessed cavities correspond to each other when the mating portions are mated. The bottom molding-base and the blow molding-base are respectively assembled to two ends of the main molding-base. The blow molding-base has a gas blowing portion. The main molding-base, the bottom molding-base, and the blow molding-base collectively define a forming space for forming a blank. The blow molding-base has an expanded portion extended toward the mating portions. Each of the mating portions has a recessed section corresponding to the expanded portion. Accordingly, the blank can be positioned in the molding device.

4 Claims, 6 Drawing Sheets

THREADLESS PLASTIC BLOW MOLDING DEVICE

BACKGROUND OF THE INVENTION

Field of the Invention

The present invention relates to a plastic blow molding device, and more particularly to a plastic blow molding device for forming threadless blank.

Description of the Prior Art

Plastic bottles or cups can be formed by applying blow molding techniques to a blank 6 in a bottle mold 5. In detail, as shown in FIG. 6, the bottle mold 5 defines a forming space 51 therein for disposing the blank 6 and for applying blow molding to the blank 6. A bottom molding-base 52 is assembled to one of two opposite ends of the bottle mold 5, while a gas blowing portion 52 is assembled to the other end of the bottle mold 5. In addition, a thread section 61 and an annular protruded portion 62 are defined at one end of the blank 6 corresponding to the gas blowing portion 52, such that the blank 6 can be positioned via the thread section 61 and the annular protruded portion 62 when the blank 6 is molding. In practice of the blow molding technique, the bottle mold 5 is pressed downward to position with the annular protruded portion 62 of the blank 6, so that the blank 6 can sustain the pressure generated by gas blowing from the gas blowing portion 52, thereby changing the shape of the blank 6.

Cups of bottles made by the aforementioned technique have thread section 61 and annular protruded portion 62 at one end thereof. However, the thread section 61 and the annular protruded portion 62 are not necessary for some products, and the thread section 61 and the annular protruded portion 62 have to be cut from the products. Those materials cut from the product become waste and cannot be reused. In addition, after those unnecessary materials are cut from the products, sharp edges or corners may be formed on the products, thus the products have to undergo an additional polishing and milling process to smooth the surface. Consequently, the manufacturing of the conventional is complicated.

The present invention is, therefore, arisen to obviate or at least mitigate the above mentioned disadvantages.

SUMMARY OF THE INVENTION

One object of the present invention is to provide a threadless plastic blow molding device. The device has a recessed cavity for engaging with an end portion of the opening of a threadless blank, so that the blank can be positioned in the device.

To achieve the above and other objects, a threadless plastic blow molding device is provided and comprises a main molding-base, a bottom molding-base, and a blow molding-base. The main molding-base has two mating portions. Each of the mating portions defines a recessed cavity. The recessed cavities correspond to each other when the mating portions are mated with each other. The bottom molding-base is assembled to one of two opposite ends of the main molding-base. The blow molding-base is assembled to the other end of the main molding-base. The blow molding-base has a gas blowing portion. The main molding-base, the bottom molding-base, and the blow molding-base collectively define a forming space for forming a blank. The blow molding-base has an expanded portion extended toward the mating portions. Each of the mating portions has a recessed section corresponding to the expanded portion.

In addition, the blow molding-base has a base portion extended upward, and the expanded portion is configured at the periphery of the top of the base portion.

In one embodiment, the expanded portion comprises a lateral peripheral section protruded outward and curvedly.

In another embodiment, the expanded portion comprises a lateral peripheral section having a flat and vertical surface.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
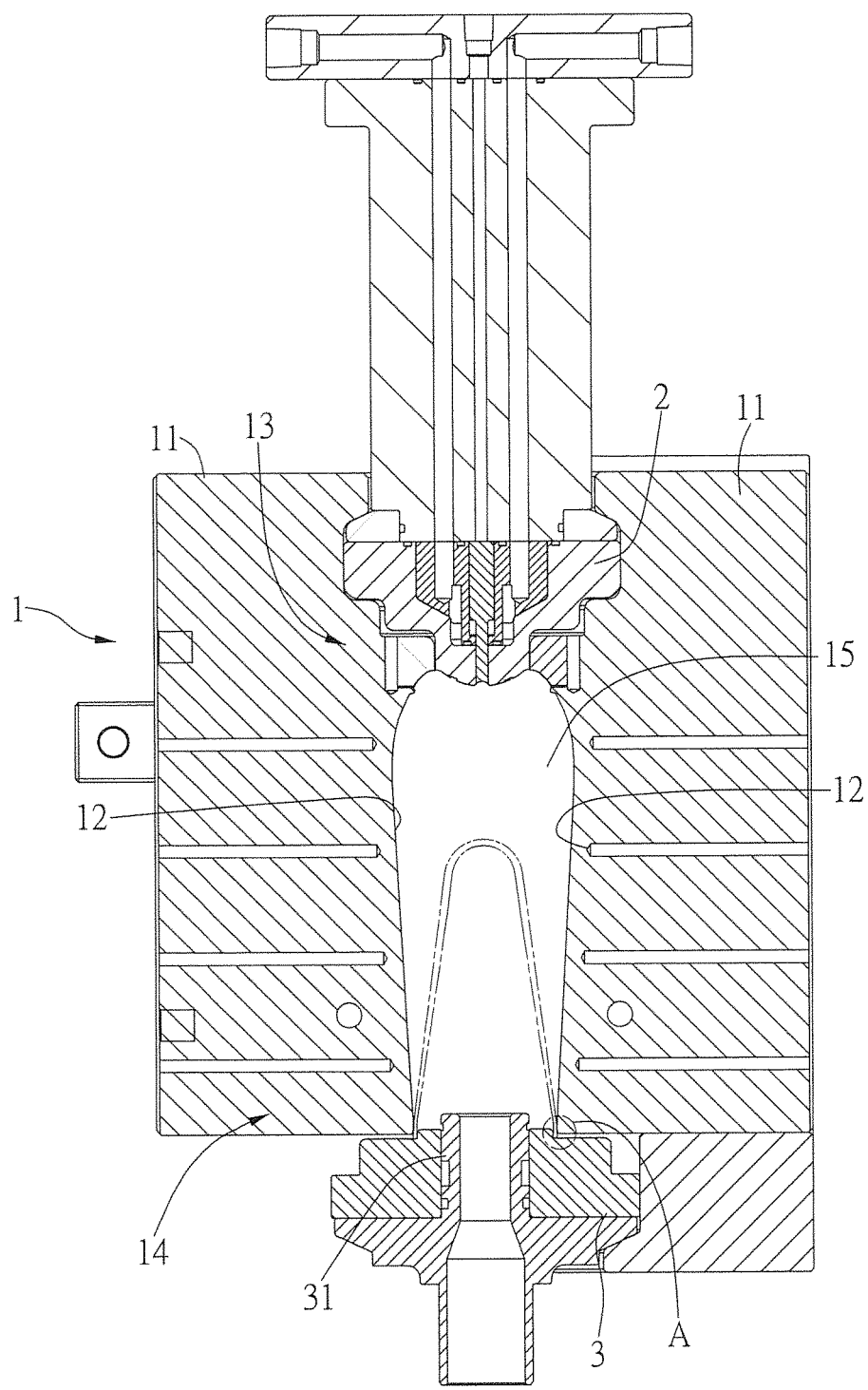
FIG. 1 illustrates a sectional view of a threadless plastic blow molding device according to a first embodiment of the present invention.

Please refer to FIG. 1, illustrating a threadless plastic blow molding device according to a first embodiment of the present invention. The threadless plastic blow molding device comprises a main molding-base 1, a bottom molding-base 2, and a blow molding-base 3. The main molding-base 1 has two mating portions 11. Each of the mating portions 11 defines a recessed cavity 12. The recessed cavities 12 correspond to each other when the mating portions 11 are mated with each other. The main molding-base 1 has a first end 13 and a second end 14 opposite to the first end 13. The bottom molding-base 2 is assembled to the first end 13, and the blow molding-base 3 is assembled to the second end 14. The blow molding-base 3 has a gas blowing portion 31. The main molding-base 1, the bottom molding-base 2, and the blow molding-base 3 collectively define a forming space 15 for forming a blank 4.

Figure 2:
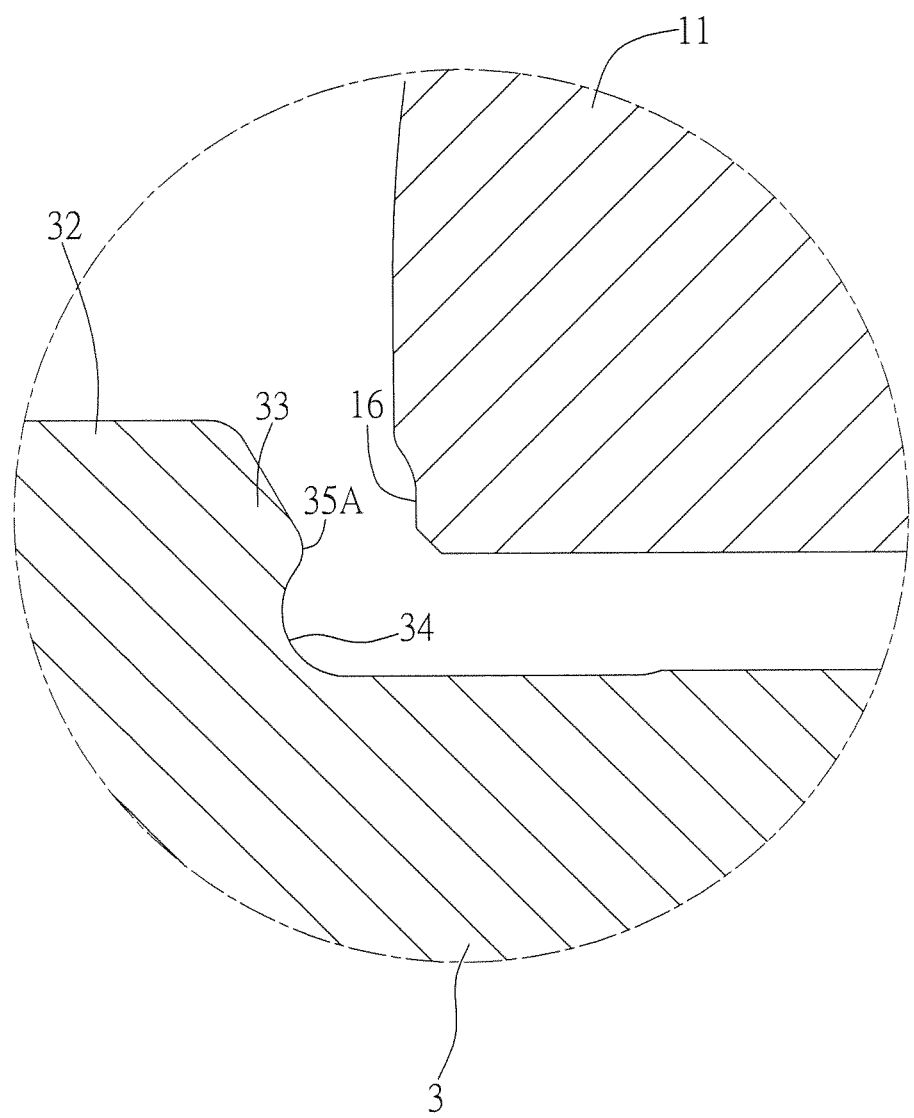
FIG. 2 illustrates a partial enlarged view of the portion A shown in FIG. 1.

Please refer to FIG. 2. The blow molding-base 3 has a base portion 32 extended upward, and an expanded portion 33 is configured at the periphery of the top of the base portion 32 and extended toward the mating portions 11. Furthermore, since the expanded portion 33 is expanded outward in a transversal direction, an annular recessed portion 34 is formed at the bottom of the expanded portion 33 of the base portion 32 and opposite to the expanded portion 33. In addition, the expanded portion 33 defines a lateral peripheral section 35A at the periphery thereof. In this embodiment, the lateral peripheral section 35A is protruded outward and curvedly. On the other hand, the second end 14 of the main molding-base 1, i.e., the ends of the mating portions 11 being proximate to the blow molding-base 3, respectively has a recessed section 16 corresponding to the expanded portion 33. The recessed sections 16 are of curved shape.

Figure 3:
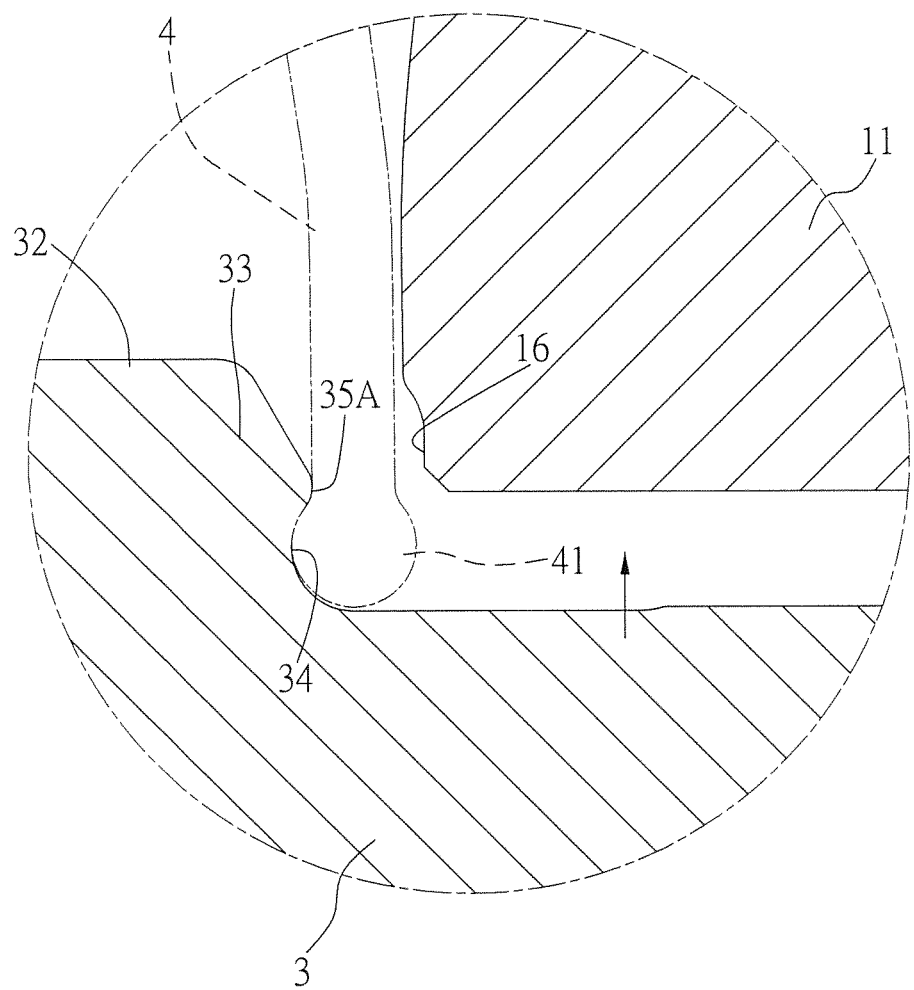
FIG. 3 illustrates an operational schematic view (1) of the threadless plastic blow molding device of the first embodiment.
Figure 4:
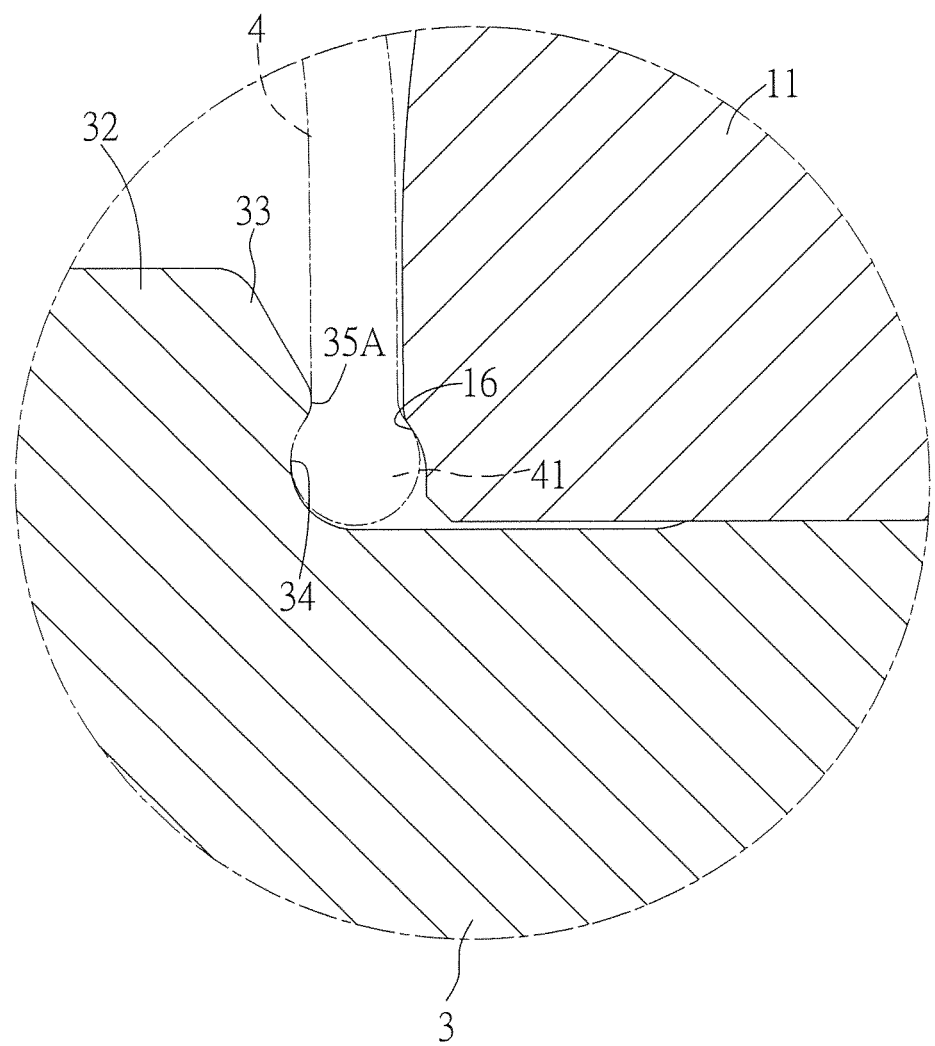
FIG. 4 illustrates an operational schematic view (1) of the threadless plastic blow molding device of the first embodiment.

Accordingly, a threadless blank in cup or bottle shaped can be positioned by the molding device according embodiments of the present invention, thus blow molding techniques can be carried out. In assembling the blank 4 with the device, as shown in FIG. 3, firstly the end portion 41 of the blank 4, formed in ball shaped, is engaged with the base portion 32 of the blow molding-base 3, where the end portion 41 of the blank 4 is engaged in the annular recessed portion 34, and the lateral periphery section 35A of the expanded portion 33 is abutted against the upper part of the end portion 41 of the blank 4. Next, as shown in FIG. 4, when the blow molding-base 3 is mated with the mating portions 11, the end portion 41 of the blank 4 is engaged in the recessed sections 16 of the mating portions 11, and the curved walls of the recessed sections 16 are abutted against the upper parts of the end portion 41 of the blank 4. Based on this, the end portion 41 of the blank 4 is simultaneously abutted against the expanded portion 33 of the blow molding-base 3 and the recessed sections 16 of the mating portions 11, thus the blank 4 can be positioned with the molding device. Accordingly, when the gas blowing portion 31 applies gas to the blank 4, the blank 4 can be firmly positioned in the molding device, facilitating the blow molding procedure.

Figure 5:
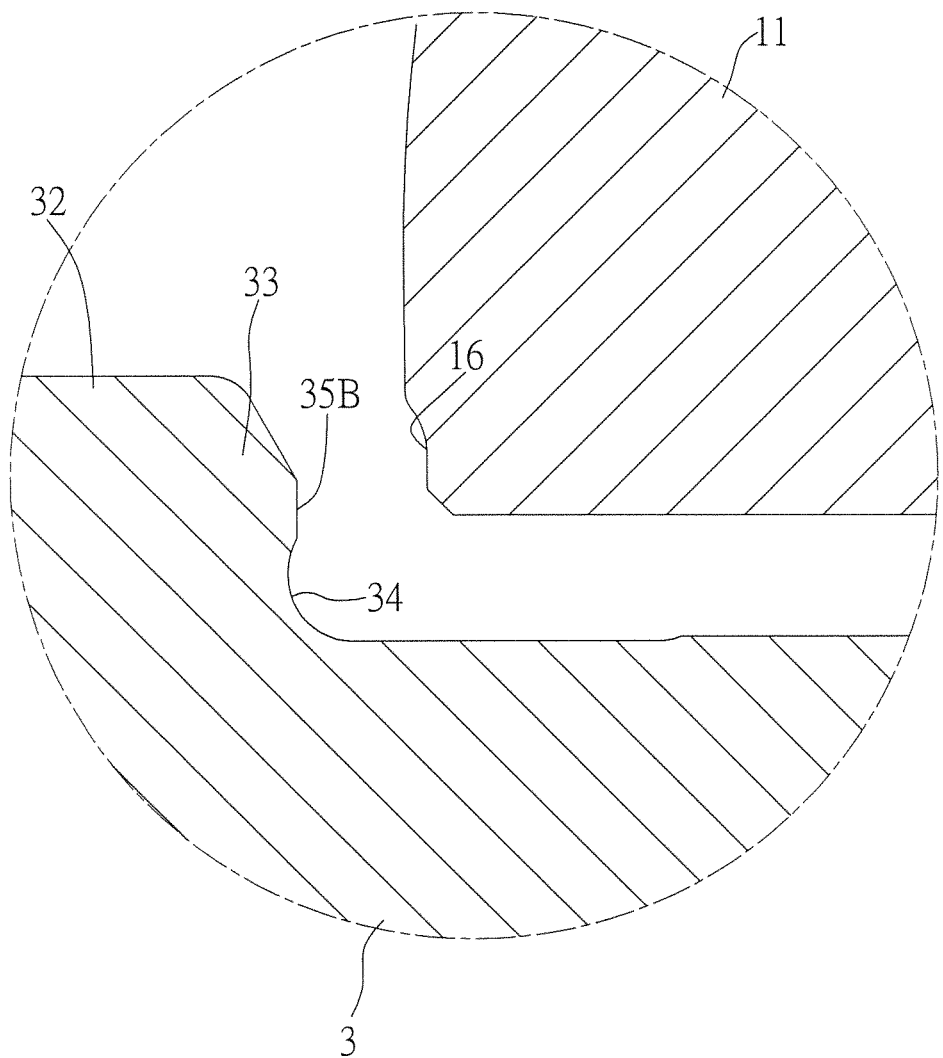
FIG. 5 illustrates a sectional view of a blow molding-base of a threadless plastic blow molding device according to a second embodiment of the present invention.
Figure 6:
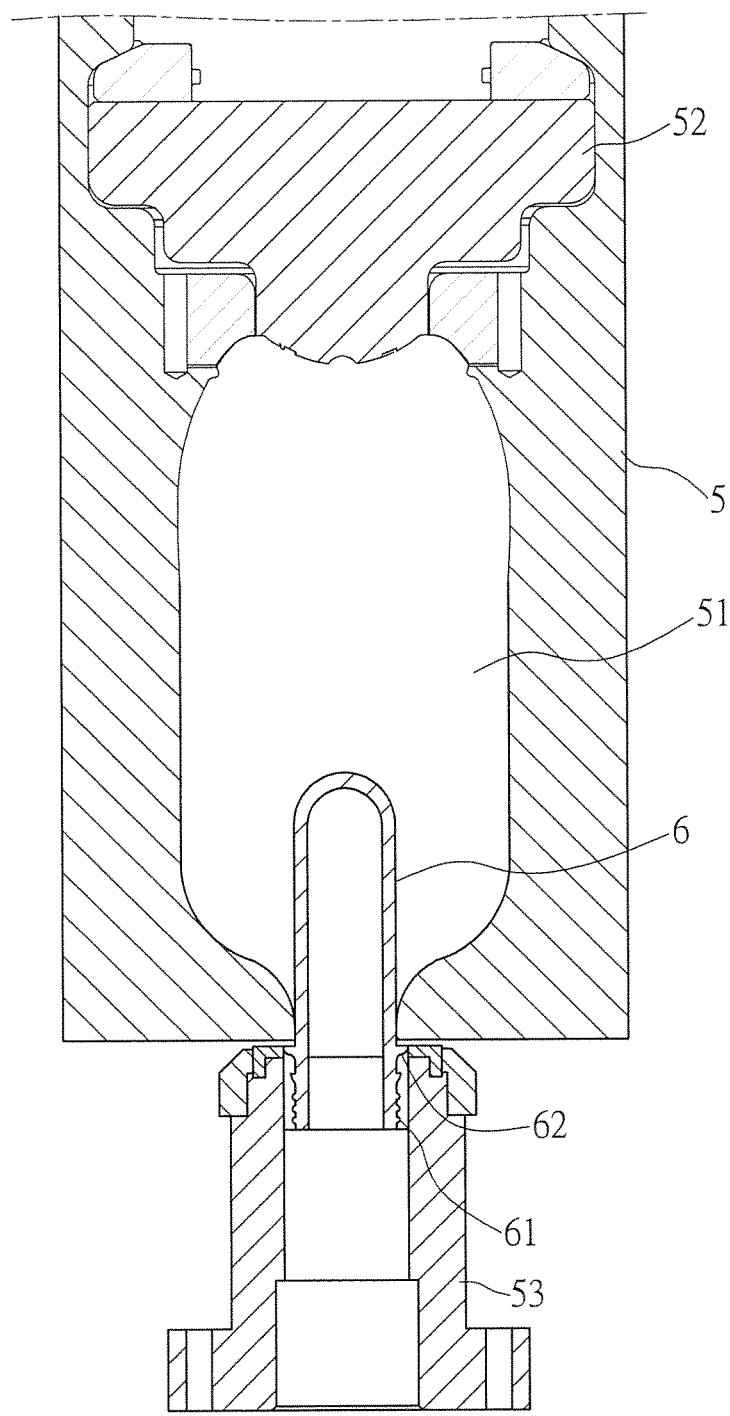
FIG. 6 illustrates a sectional view of a conventional blow molding device.

Please refer to FIG. 5, which illustrates a threadless plastic blow molding device according to a second embodiment of the present invention. The structure of the second embodiment is approximately the same as that of the first embodiment, except the shape of the expanded portion 33. In the second embodiment, the lateral peripheral section 35B of the expanded portion 33 has a flat and vertical surface. Accordingly, the surface is abutted against the sidewall of the blank 4 for positioning the blank 4.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A threadless plastic blow molding device, comprising:
   a main molding-base, having two mating portions, wherein each of the mating portions defines a recessed cavity, the recessed cavities correspond to each other when the mating portions are mated with each other;
   a bottom molding-base, assembled to one of two opposite ends of the main molding-base; and
   a blow molding-base, having a gas blowing portion, wherein the blow molding-base is assembled to the other end of the main molding-base, and wherein the main molding-base, the bottom molding-base, and the blow molding-base collectively define a forming space for forming a blank;
   wherein the blow molding-base has a base portion protruding therefrom, and an expanded portion extended transversely outward from the base portion toward the mating portions, the expanded portion is configured to define an annular recessed portion therebeneath for retentively engaging an end portion of the blank, and each of the mating portions has a recessed section corresponding to the expanded portion.

2. The threadless plastic blow molding device according to claim 1, wherein the base portion is extended upward from the blow molding-base, and the expanded portion is configured at the periphery of the top of the base portion.

3. The threadless plastic blow molding device according to claim 1, wherein the expanded portion includes a lateral peripheral section protruded outward and curvedly.

4. The threadless plastic blow molding device according to claim 1, wherein the expanded portion includes a lateral peripheral section having a flat and vertical surface.

* * * * *